US006798743B1

(12) United States Patent
Ma et al.

(10) Patent No.: US 6,798,743 B1
(45) Date of Patent: Sep. 28, 2004

(54) PACKET PRIORITIZATION PROCESSING TECHNIQUE FOR ROUTING TRAFFIC IN A PACKET-SWITCHED COMPUTER NETWORK

(75) Inventors: Qingming Ma, Santa Clara, CA (US); Saravanan Agasaveeran, Sunnyvale, CA (US); Zhanhe Shi, San Jose, CA (US); Steven Berl, Piedmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/274,091

(22) Filed: Mar. 22, 1999

(51) Int. Cl.[7] ................................................. H04J 1/16
(52) U.S. Cl. ...................................... 370/235; 370/413
(58) Field of Search ............................... 370/229, 230, 370/231, 235, 351, 389, 395.21, 395.32, 395.4, 395.41, 395.42, 412–419, 400, 468, 477

(56) References Cited

U.S. PATENT DOCUMENTS

| | | | | |
|---|---|---|---|---|
| 5,566,170 A | * | 10/1996 | Bakke et al. ............... | 370/392 |
| 5,991,812 A | * | 11/1999 | Srinivasan ................... | 709/232 |
| 6,078,953 A | * | 6/2000 | Vaid et al. .................. | 709/223 |
| 6,538,989 B1 | * | 3/2003 | Carter et al. ................ | 370/229 |

OTHER PUBLICATIONS

Hamdi et al, Asymmetric Best Effort Services for Packet Networks, pp. 1–11, EPFL–DI–ICA Report No. 98/286, Jul. 1998.*

Braden et al, Integrated Services in the Internet Architecture: an Overview, RFC 1633, pp. 1–28, Jul. 1994.*

Parekh, A.K. and Gallager, R.G., "A Generalized Processor Sharing Approach to Flow Control in Integrated Services Networks: The Single–Node Case," *IEEE/ACM Transactions on Networking*, vol. 1, No. 3, pp. 344–357, Jun. 1993.

Silberschatz, A. and Galvin, P.B., "Operating System Concepts," pp. 142–143, published prior to Mar. 1999.

* cited by examiner

*Primary Examiner*—Frank Duong
(74) *Attorney, Agent, or Firm*—Beyer, Weaver & Thomas, LLP.; Dean E. Wolf, Esq.

(57) ABSTRACT

A two-phase packet processing technique is provided for routing traffic in a packet-switched, integrated services network which supports a plurality of different service classes. During Phase I, packets are retrieved from the router input interface and classified in order to identify the associated priority level of each packet and/or to determine whether a particular packet is delay-sensitive. If it is determined that a particular packet is delay-sensitive, the packet is immediately and fully processed. If, however, it is determined that the packet is not delay-sensitive, full processing of the packet is deferred and the packet is stored in an intermediate data structure. During Phase II, packets stored within the intermediate data structure are retrieved and fully processes. The technique of the present invention significantly reduces packet processing latency, particularly with respect to high priority or delay-sensitive packets. It is easily implemented in conventional routing systems, imposes little computational overhead, and consumes only a limited amount of memory resources within such systems.

52 Claims, 10 Drawing Sheets

PACKET PRIORITIZATION PROCESSING TECHNIQUE FOR ROUTING TRAFFIC IN A PACKET-SWITCHED COMPUTER NETWORK

BACKGROUND OF THE INVENTION

1. Field of Invention

The present invention relates generally to methods and apparatus for transmitting digital data in a packet-switched computer network. More specifically, the present invention relates to a packet prioritization processing technique for routing traffic in a packet-switched computer network.

2. Routers and Network Protocol

A computer network is a geographically distributed collection of interconnected communication links for transporting data between nodes, such as computers. By definition, a network is a group of computers and associated devices that are connected by communications facilities or links. Network connections can be of a permanent nature, such as via cables, or can be of a temporary nature, such as connections made through telephone or other communication links. A plurality of computer networks may be further interconnected by intermediate nodes, or routers, to extend the effective "size" of the networks, smaller portions of which may be maintained as autonomous domains of nodes. A router is computer system that stores and forwards data packets from one local area network (LAN) or wide area network (WAN) to another. Routers see the network as network addresses and all the possible 10 paths between them. They read the network address in a transmitted message and can make a decision on how to send it based on the most expedient route (traffic load, line costs, speed, bad lines, etc.). Routers typically communicate by exchanging discrete "packets" of data according to predefined protocols. In this context, a protocol comprises a set of rules defining how the nodes interact with each other.

Networks vary in size, from a local area network (LAN) consisting of a few computers and related devices, to a wide area network (WAN) which interconnects computers and LANS that are geographically dispersed. An internetwork, in turn, is the joining of multiple computer networks, both similar and dissimilar, by means of gateways or routers that facilitate data transfer and conversion from various networks. A well known abbreviation for internetwork is internet. As currently understood, the capitalized term Internet refers to the collection of networks and gateways that uses a Transmission Control Protocol/Internet Protocol (TCP/IP). The Internet has recently seen explosive growth by virtue of its ability to link computers located throughout the world.

FIG. 1 shows a diagram of an IP network, which is an example of one type of flow-based network in which the technique of the present invention may be implemented. A flow can be a hard-state virtual circuit in an ATM network, a soft-state flow in an IP network (e.g., a MPLS tunnel), or a stateless connection as a TCP/IP connection in today's Internet. As shown in FIG. 1, the IP network 2 includes the Internet (or a WAN) 4 over which a Node 16 (e.g. a computer) can communicate with a separate node 6 via a plurality of intermediate nodes (e.g. R1, R3, R4). Node 6 may be, for example, a server which is part of Local Area Network (LAN) 7, connected to the Internet via routers R1 and R3. Router R3 (10) may, in turn, connect one or more other routers (e.g., router R2) with the Internet.

A LAN is a communication network that serves users within a confined geographical area. It is made up of servers, workstations, a network operating system and a communications link. Servers are high-speed machines that hold programs and data shared by all network users. The workstations, or clients, are the user' personal computers, which perform stand-alone processing and access the network servers as required The controlling software in a LAN is the network operating system, such as, for example, NetWare, UNIX, and/or Appletalk, which resides in the server. Message transfer is managed by a transport protocol such as, for example, IPX, SPX, SNA and/or TCP/IP. The physical transmission of data is performed by the access method (Ethernet, Token Ring, etc.) which is implemented in the network adapters that plug into the machines. The actual communications path is the cable (twisted pair, coax, optical fiber) that interconnects each network adapter.

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services. The layered protocols, commonly referred to as protocol stacks, are described in greater detail with reference to FIG. 2.

FIG. 2 illustrates the relationship of subnetworks and gateways to layered protocols. Assume that the user application 202A in host A sends an application protocol data unit (PDU) to an application layer protocol 202B in host B, such as, for example, a file transfer system. The file transfer software performs a variety of functions and sends file records to the user data. In many systems, the operations at host B are known as server operations and the operations at host A are know as client operations.

As indicated by the downward arrows in the protocol stack at host A, this unit is passed to the transport layer protocol 204A, which performs a variety of operations and adds a header to the PDU passed to it. At this point, the unit of data is often referred to as a segment. The PDU from the upper layers is considered to be data to the transport layer.

Next, the transport layer passes the segment to the network layer 206A, also called the IP layer, which again performs specific services and appends a header. This unit (now called a datagram in internet terms) is passed down to the lower layers. Here, the data link layer adds its header as well as a trailer, and the data unit (now called a frame) is launched into subnetwork 210 by the physical layer 208A. Of course, if host B sends data to host A, the process is reversed and the direction of the arrows is changed.

Internet protocols are typically unaware of what goes on inside the network. The network manager is free to manipulate and manage the PDU in any manner necessary. In some instances, however, the internet PDU (data and headers) remains unchanged as it is transmitted through the subnet. In FIG. 2, it emerges at the gateway where it is processed through the lower layers 214 and passed to the IP (network) layer 212. Here, routing decisions are made based on the destination address provided by the host computer.

After these routing decisions have been made, the PDU is passed to the communications link connected to the appropriate subnetwork (comprising the lower layers). The PDU is re-encapsulated into the data link layer frame and passed to the next subnetwork 216, where it finally arrives at the destination host.

The destination (host B) receives the traffic through its lower layers and reverses the process that transpired at host A; it de-encapsulates the headers by stripping them off in the appropriate layer. The header is used by the layer to determine the actions it is to perform; the header therefore governs the layer's operations.

The PDU created by the file transfer application in the application service layer is passed to the file transfer application residing at host B. If lost A and B are large mainframe computers, this application is likely an exact duplicate of the software at the transmitting host. The application might, however, perform a variety of functions, depending on the header it receives. It is conceivable that the data could be passed to another end-user application at host B, but in many instances the user at host A merely wants to obtain the services of a server protocol, such as a file transfer or email. If this is the case, it is not necessary for an end-user application process to be invoked at host B.

To return the retrieved data from the server at host B to the client at host A, the process is reversed. The data is transferred down through the layers in the host B machine, through the network, through the gateway, to the next network, and up the layers of host A to the end-user.

FIG. 3 is a block diagram of a network system 300 comprising a collection of computer networks connected to a plurality of nodes. The nodes are typically general purpose computers comprising a source node S, an end node N, a destination node D and a plurality of intermediate nodes or routers R1 and R2. Each node typically comprises a central processing unit (CPU) 302, a memory unit 304 and at least one network adapter 306 interconnected by a system bus 310. The memory unit 304 may comprise storage locations typically composed of random access memory (RAM) devices, which are addressable by the CPU 302 and network adapter 306. The memory unit typically provides temporary storage of information, such as, for example, executable processes and contents of data packets, as described further herein. An operating system, portions of which are typically resident in memory and executed by CPU, functionally organizes the node by, inter alia, invoking network operations in support of those processes executing in the CPU.

The computer networks included within system 300 may range from local area networks (LANs) to wide area networks (WANs). A LAN is a limited area network, while a WAN may be a public or private telecommunications facility that interconnects nodes widely dispersed using communication links. Communication among the nodes coupled to these networks is typically effected by exchanging discrete data "packets" specifying addresses of, e.g., source and destination nodes. Since the system shown in FIG. 3 comprises a relatively small group of interconnected LANs 1–3, it is typically maintained as an autonomous domain. The intermediate nodes, typically routers, are configured to facilitate the flow of data packets throughout the domain 300 by routing those packets to the proper receiving nodes.

In general, when a source node S transmits a packet over LAN 1, the packet is sent to all nodes on that LAN. If the intended recipient of the packet is connected to LAN 3, the packet is routed through router R1, over LAN 2 and through R2 onto LAN 3. A key function of a router is determining the next node to which the packet is sent; this routing function is typically performed by network layer 360 of a protocol stack 350 within each node. Typically, the packet includes two destination addresses: the address of the final destination node and the address of the next node along the route. The final destination address remains constant as the packet traverses the networks along an optimal route, while the next destination address changes as the packet moves from node to node along the optimal route through the networks.

Specifically, when source node S sends a packet to destination node D, i.e., the final destination address, the packet is transmitted onto LAN 1 with a next destination address specifying the address of router R1. Address information embedded in the packet, which is processed by the higher-layer software of the protocol stack 350, identifies the final destination of the packet as node D. Based on this information, R1 determines that the next node along the optimal path is router R2 and proceeds to pass the packet onto LAN 2 for reception by that node. Router R2 then determines that the next node is the final destination node D and transmits the packet over LAN 3 to node D.

3. Routers and Packet Processing

Future Internet will support both high-priority multimedia traffic, such as, voice and video streams, and low-priority data traffic such as, best-effort traffic. Typically, Quality-of-Service (QoS) delivery of high-priority traffic requires stringent QoS guarantees. In order to meet these stringent QoS guarantees, various packet queuing algorithms have been developed, such as, for example, priority queuing and Weighted Fair Queuing (WFQ). These queuing algorithms are typically implemented at the router level, and more specifically at the QoS output queues where processed packets have been enqueued to await their turn to be forwarded or routed to the appropriate output interface line. A primary purpose of these queuing algorithms is to give preferential treatment to packets having higher priority (which are enqueued at the router output interface) over other enqueued packets having lower priority. However, the process of implementing these queuing algorithms in software can be quite challenging, as described in greater detail below.

The router CPU typically streamlines packet processing by processing one packet at a time. A new arriving packet may be immediately processed if the router CPU is idle. However, if the router CPU is not idle (e.g. when the router CPU is processing other packets) the arriving packet will sit in an input interface queue and await its turn for processing. It is difficult if not impossible for the router forwarding engine to take this waiting time into account in its queuing algorithm because the packet is not classified while waiting. The router does not know the source ID, destination ID, or traffic class of this packet before it is processed.

Thus, for example, when a burst of packets arrives at a router from different upstream nodes simultaneously, most of these packets will have to wait in their respective input interface queues before being processed. With increased number of interface cards, this waiting time can be significant. Moreover, deploying sophistocated queuing algorithms can significantly increase the processing time of a packet, which will also result in longer waiting time for packets sitting in the input interface queues.

With the possible increased waiting time and the fact that it is difficult to take this waiting time into consideration in the packet queuing algorithm, a delay-sensitive packet, such as, for example, a voice packet, may miss its "supposed" departing time even before it is processed. The "supposed" departing time is the time the packet should theoretically be transmitted to the down stream node according to the queuing algorithm, assuming that the packet can be processed immediately upon its arrival.

The above-described inaccuracies in the software implementation of packet forwarding and queuing algorithms can significantly increase the latency of delay-sensitive packets such as voice or video packets. Further, these inaccuracies reduce the possibility of end-to-end delay guarantees, and significantly affect the quality of voice or other audio applications over Internet.

It is desirable, therefore, to provide a technique which can significantly reduce packet latency associated with routing high priority or delay sensitive packets. It is also desirable to provide a technique which is simple in design, imposes little computational overhead, and which consumes only a limited amount of memory resources.

SUMMARY OF THE INVENTION

According to specific embodiments of the invention, a technique is provided for routing traffic in a packet-switched, integrated services network which supports a plurality of different service classes. More specifically, the technique of the present invention significantly reduces packet processing latency, particularly with respect to high priority or delay-sensitive packets. The technique of the present invention may be easily implemented in conventional routing systems. Further, it imposes little computational overhead, and consumes only a limited amount of memory resources within the system.

According to one aspect of the technique of the present invention, preferential treatment is given to those packets that are delay-sensitive at processing time by deferring full processing of non-delay-sensitive packets. Instead of processing every packet from decapsulation until it is placed into an appropriate output queue, the whole data path is broken into two phases. In Phase I, a newly arriving packet is pre-processed, which includes decapsulation and simple packet classification for identifying the priority of the packet and/or for determining whether the packet is delay-sensitive. If the packet is determined to be delay-sensitive, it is immediately and fully processed, which includes routing the packet to an appropriate output interface queue. However, if it is determined that the packet is not delay-sensitive, the packet is stored in an intermediate data structure to await full processing. After completing Phase I processing of at least some of the packets sitting in the input interface cards, Phase II processing begins. During Phase IT processing, at least a portion of the intermediate packets queued within the intermediate data structure are retrieved and fully processed.

According to a specific embodiment of the invention, a method is provided for routing traffic in a packet-switched, integrated services network which supports a plurality of different service classes. The network includes at least one router having at least one input interface and at least one output interface. The method includes preprocessing at least one packet queued at the input interface, wherein preprocessing includes classifying the packet to determine an associated priority level of the packet. Preprocessing does not include routing the packet to an appropriate output interface queue. If the associated priority level of the packet is at least priority P, the packet is fully processed, including routing the packet to an appropriate output interface queue. If, however, the associated priority level of the packet is less than priority P, the packet is stored in an intermediate data structure to await full processing.

A second specific embodiment of the present invention provides a method for routing traffic in a packet-switched, integrated services network which supports a plurality of different service classes. The network includes at least one router having at least one input interface and at least one output interface. The method comprises preprocessing at least one packet from the input interface to determine if the packet is delay-sensitive. The preprocessing includes classifying the packet to determine an associated priority level of the packet. If the packet is determined to be delay-sensitive, it is immediately and fully processed, which includes routing the packet to an appropriate output interface queue. If the packet is determined not to be delay-sensitive, the packet is stored in an intermediate data structure to await full processing. The intermediate data structure is used for queuing packets which have been preprocessed, but which have not yet been processed sufficiently to be routed to an appropriate output interface queue.

A third specific embodiment of the present invention provides a computer program product for routing traffic in a packet-switched integrated services network which supports a plurality of different service classes. The network includes at least one router. The router includes at least one input interface having at least one line input and at least one output interface. The computer program product comprises at least one computer useable medium having computer code embodied therein. The computer readable code comprises computer code for processing at least one packet from the input interface to determine if the packet is delay-sensitive, wherein the preprocessing code includes computer code for classifying the packet; computer code for fully processing the packet if the packet is determined to be delay-sensitive, the fully processing code including computer code for routing the packet to an appropriate output interface queue; and computer code for storing the packet in an intermediate data structure before fully processing the packet if the packet is determined not to be delay-sensitive. The intermediate data structure is used for queuing packets which have been preprocessed, but which have not yet been processed sufficiently to be routed to an output interface queue.

A fourth specific embodiment of the present invention provides a router for routing traffic in a packet-switched integrated services network which supports a plurality of different service classes. The router comprises a processor; at least one input interface; at least one output interface; and memory having at least one intermediate data structure. The processor is configured or designed to preprocess at least one packet from the input interface to determine if the packet is delay sensitive, wherein the preprocessing includes classifying the packet. The processor is further configured or designed to fully process the packet if the packet is determined to be delay sensitive, wherein fully processing includes routing the packet to an appropriate output interface queue. The processor is further configured or designed to store the packet in the intermediate data structure before fully processing the packet if the packet is determined not to be delay sensitive. The intermediate data structure is used for queuing packets which have been preprocessed, but which have not yet been processed sufficiently to be routed to an output interface queue.

A fifth specific embodiment of the present invention provides a router for routing traffic in a packet-switched integrated services network which supports a plurality of different service classes. The router comprises a processor; at least one input interface; at least one output interface including at least one output interface data structure for queuing packets which have been fully processed by the processor; and at least one intermediate data structure for queuing intermediate packets which have been preprocessed, but which have not yet been processed sufficiently to be routed to the output interface data structure.

Additional features and advantages of the present invention will become apparent from the following description of its preferred embodiments, which description should be taken in conjunction with the accompanying drawings.

DETAILED DESCRIPTION OF THE PREFERRED EMBODIMENT

Generally, the packet preprocessing and prioritization technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid packet preprocessing and prioritization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet preprocessing and prioritization systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet preprocessing and prioritization system may be implemented on a general-purpose network host machine such as a personal computer or workstation. Further, the invention may be at least partially implemented on a card (e.g., an interface card) for a network device or a general-purpose computing device.

Figure 1:
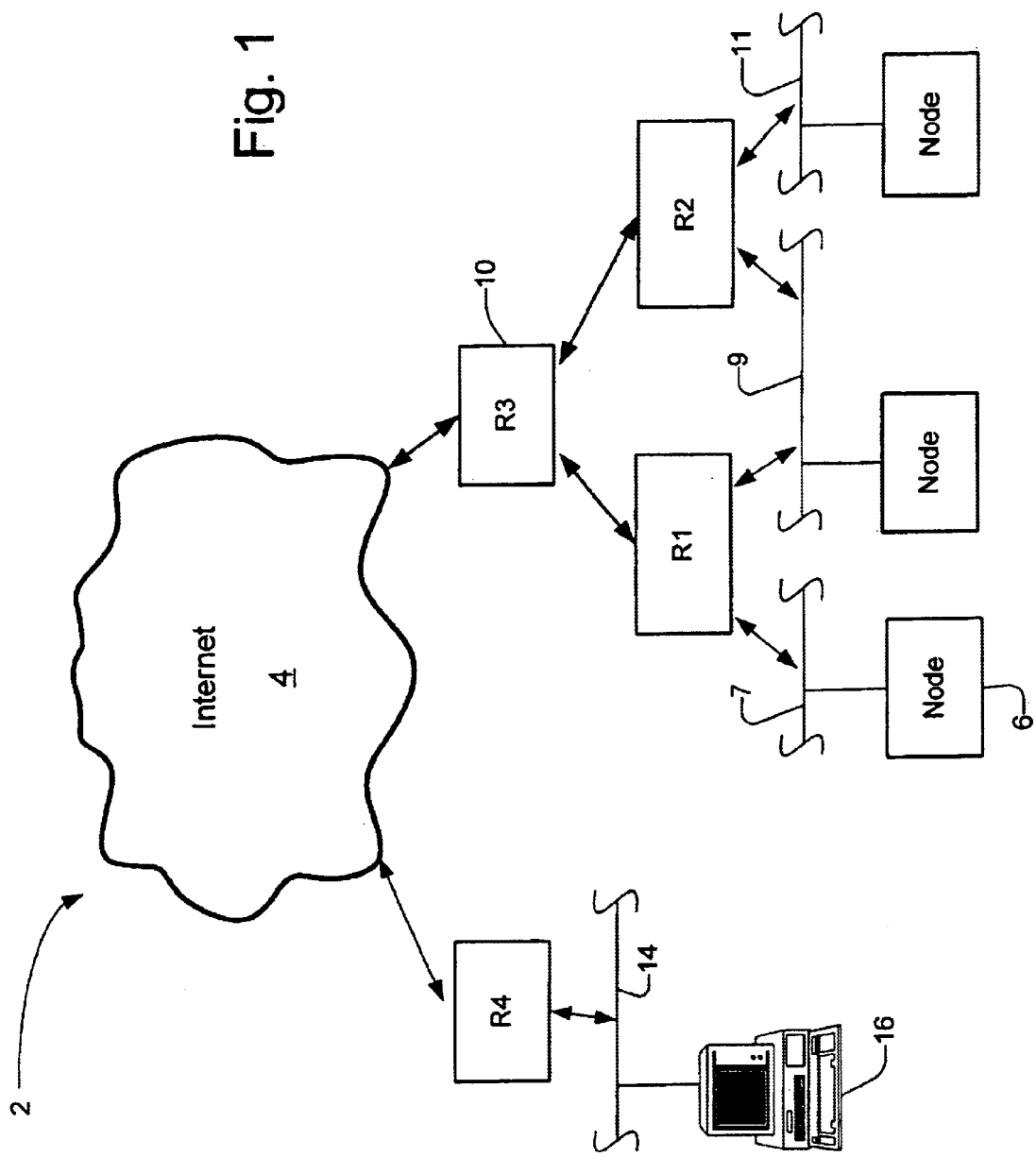
FIG. 1 shows a diagram of an IP network, which is an example of one type of packet-switched network in which the technique of the present invention may be implemented.
Figure 2:
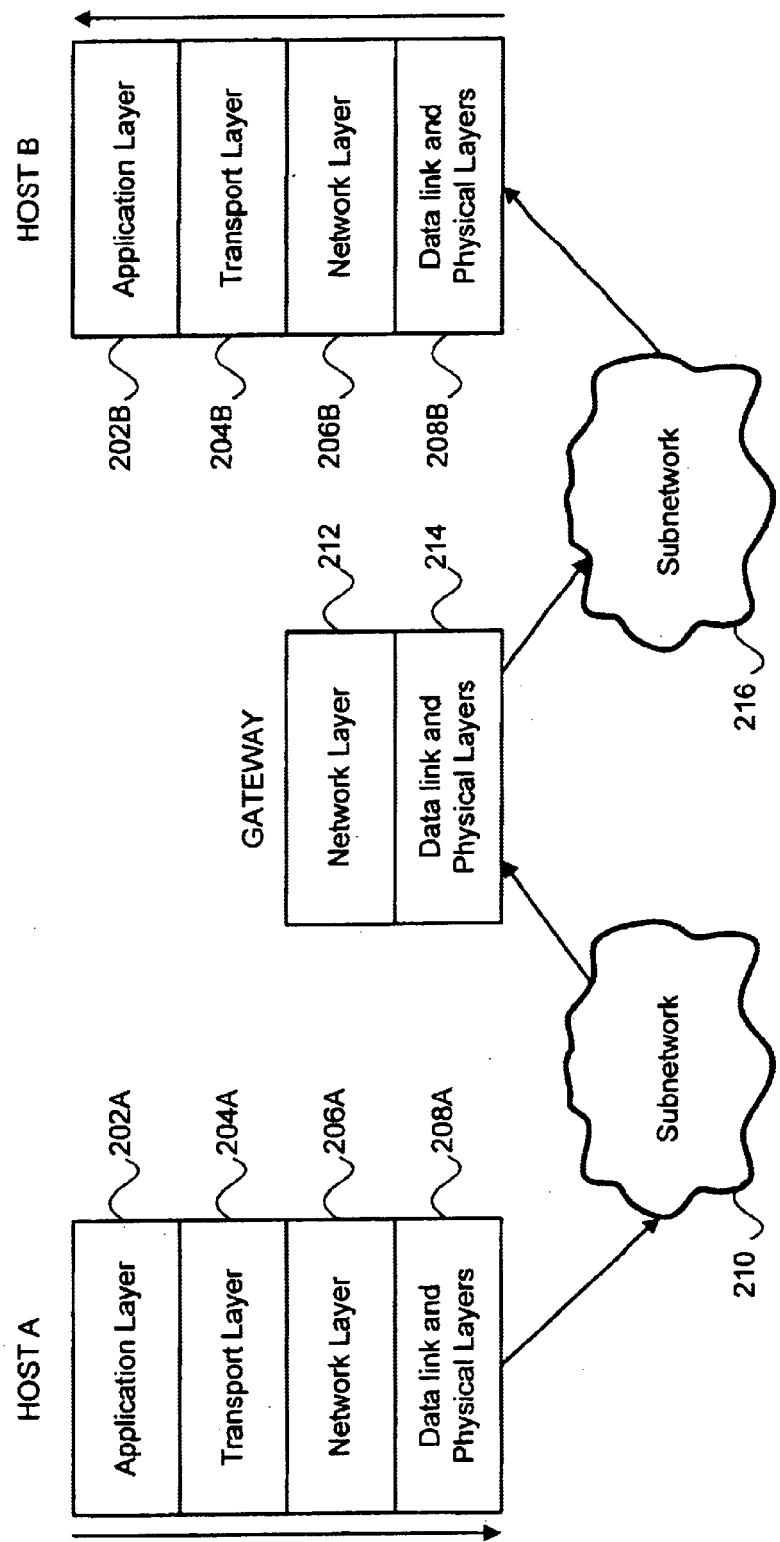
FIG. 2 is a schematic block diagram of prior art protocol stacks used to transmit data between a source node and a destination node of a computer network.
Figure 3:
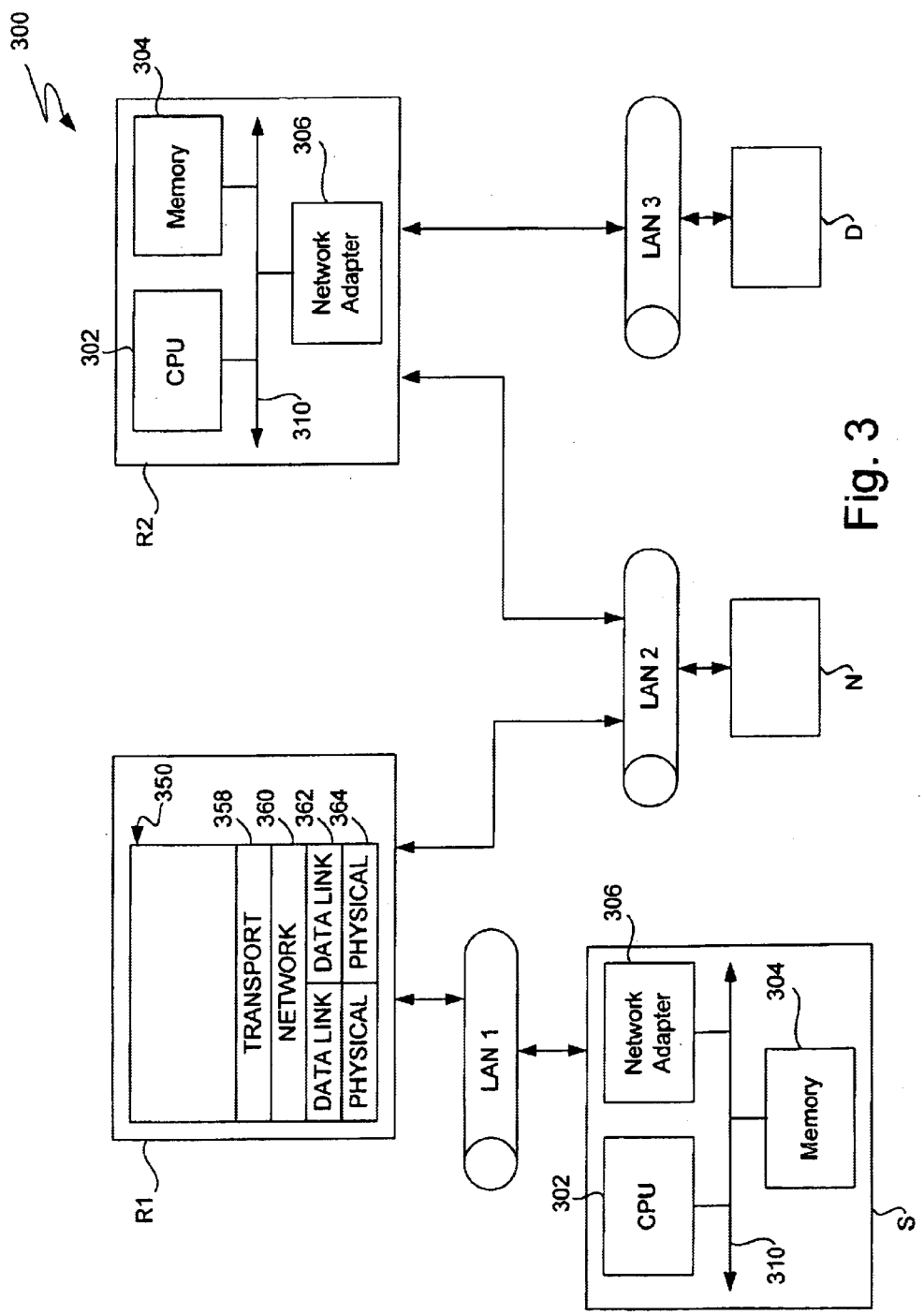
FIG. 3 is a block diagram of a computer network system including a collection of computer networks connected to a plurality of intermediate nodes or routers.
Figure 4:
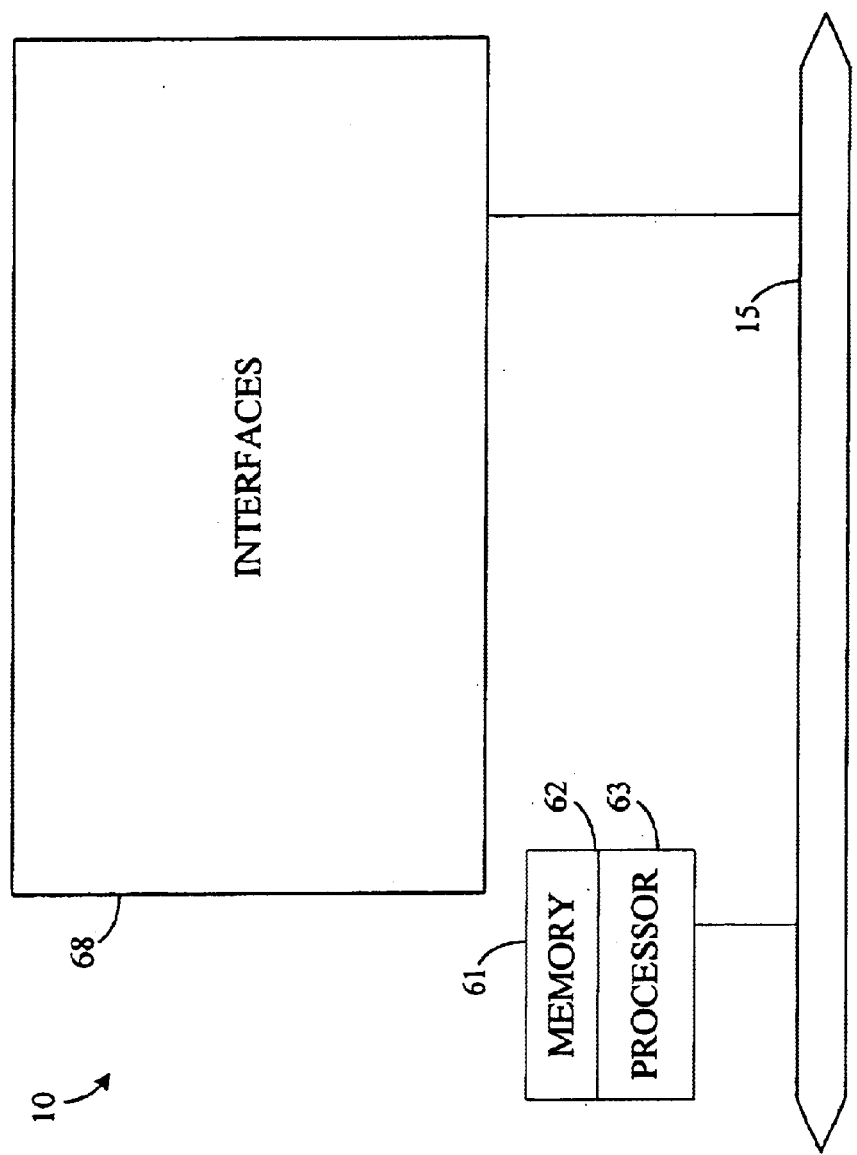
FIG. 4 is a schematic block diagram of a router which may be used in conjunction with the technique of the present invention.

Referring now to FIG. 4, a router 10 is shown, which, for example, may be configured to function as router R3 in FIG. 1. Router 10 is suitable for implementing the present invention and includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for decapsulation, classification, access list look-ups, Forwarding Information Base look-ups, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 61) configured to store program instructions for the general-purpose network operations and priority preprocessing of packets, and intermediate queuing of packets, as described herein. The program instructions may control the operation of an operating system and/or one or more applications, for example. The memory or memories may also be configured to store for example, intermediate data structures for queuing non-delay sensitive packets, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The present invention provides a novel prioritized packet processing technique to significantly reduce end-to-end processing delay associated with routing high priority or delay-sensitive packets. The idea is to give preferential treatment to packets that are delay-sensitive at processing time by deferring full processing of non-delay-sensitive packets. In order to gain a better understanding of this technique, it is helpful to first review the various processing events which typically occur in a conventional router.

Figure 7:
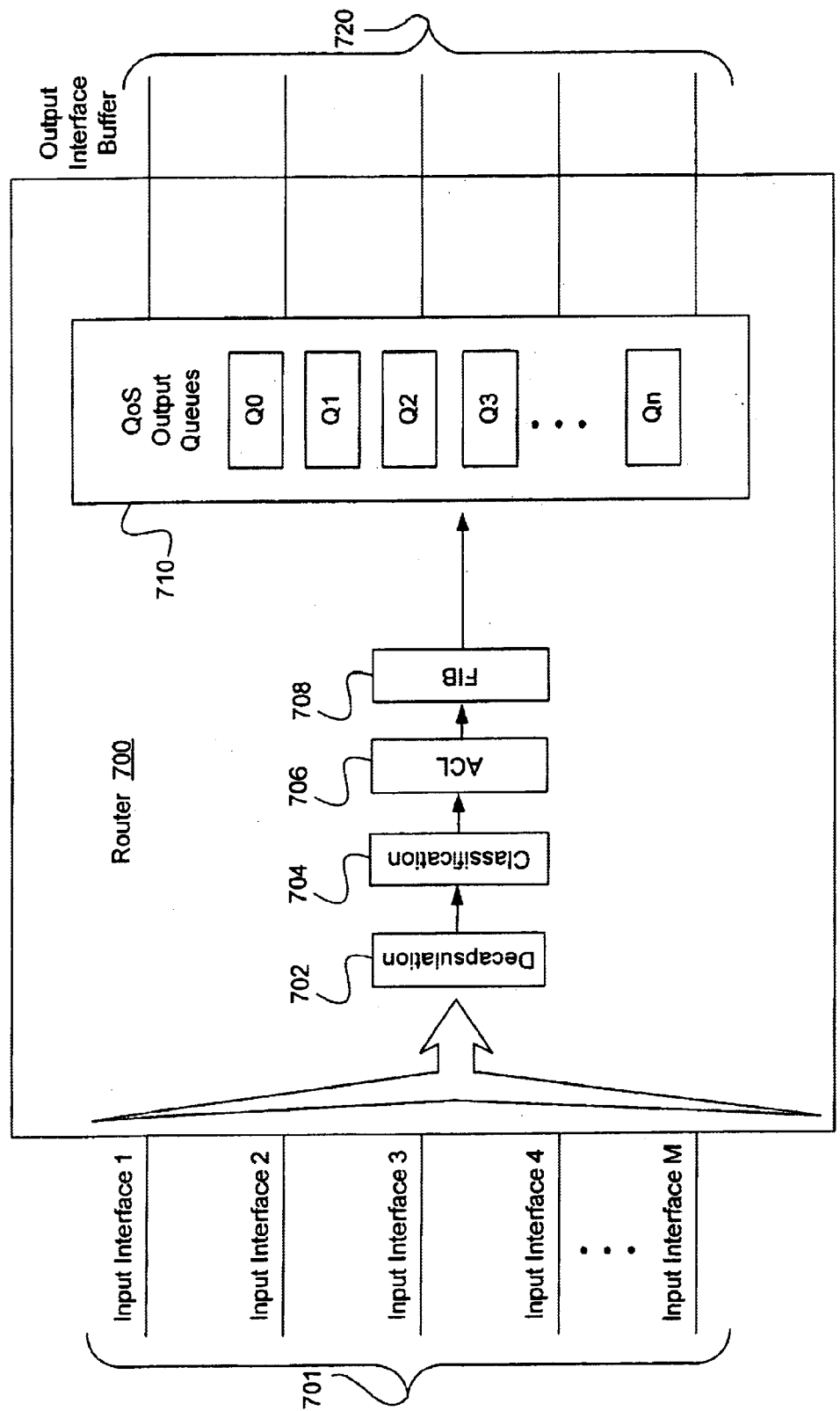
FIG. 7 illustrates a schematic block diagram of a conventional router.

FIG. 7 shows a schematic block diagram of a conventional router such as, for example, router R3 of FIG. 1. It is to be noted that the router shown in FIG. 7 has been simplified for purposes of the discussion below.

Referring to FIG. 7, a router 700 is shown which includes multiple input interfaces 701 each having a respective input interface line or card. Each input interface line may have one or more queued packets waiting to be processed and routed by router 700. Additionally, each queued packet may have a different associated priority level which specifies the particular Quality of Service (QoS) level to be used when handling that packet. Each computer network may support a variety of different QoS priority levels, which may include, for example, high priority service for multimedia traffic (e.g., voice and/or video streams), and low priority service for best effort traffic. Further, the best effort traffic may also be subdivided into a plurality of differentiated priority levels within the best-effort class.

When a packet at the input interface is processed by router 700, the packet is first dequeued from the input interface, and is then decapsulated from its data link frame, which is represented in FIG. 7 by decapsulation block 702. After decapsulation, the packet undergoes classification at 704, whereupon the associated priority level of the packet is determined. In case that QoS features are supported (such as, for example, sophisticated queuing, traffic engineering, congestion control, security checking, and/or policy routing), the packet classification may also need to identify a particular flow or traffic class to which the packet belongs. Additionally, other processing events (not shown) may occur before classification such as, for example, checksumming, wherein the number of bytes in the packet is verified before commencing with further processing of the packet. An additional processing event may include access list verification (706). Thereafter, the appropriate output interface for the packet is then determined by a Forwarding Information Base (FIB) look-up (sometimes referred to as Routing Table look-up), as shown at 708. The packet is then encapsulated and routed to its appropriate output interface queue within QoS output queuing structure 710. Typically, each queue (e.g., Q0, Q1, etc.) is a separate FIFO queue representing a distinct priority level of the QoS priority classes.

After the packet has been enqueued within its appropriate QoS output queue, it will then typically be serviced in an order related to its associated priority level. Further, the use of sophistocated QoS queuing or fairness algorithms may also be evoked at this time.

Quality of Service (QoS) Processing Considerations

As the market for differentiated QoS delivery expands, the importance of stringent QoS guarantees increases. Until recently, little attention was paid to improving QoS processing since there was not a great demand for this type of service. Consequently, conventional routers were designed to receive a packet at its input interface and fully process the packet in the fastest and simplest manner available. For this reason, it was considered undesirable to implement modifications to the packet processing algorithm which would result in: (1) an increase in system overhead; (2) a more complicated or complex router design; (3) an increase in memory access procedures; and/or (4) a slower or reduced overall performance in end-to-end processing of packets.

More recently, however, a greater effort has been focused on techniques for providing QoS deliver of high-priority traffic. Most of this recent effort has been directed to developing sophisticated algorithms for servicing the queued packets within the QoS output queues in an orderly fashion related to each packet's associated priority level. Examples of such sophisticated algorithms include flow-based weighted fair queuing (WFQ), and round robin scheduling. A primary goal of these algorithms is to provide faster processing to high priority traffic, while at the same time avoiding starvation of low priority traffic.

Typically, the full processing of a packet (including decapsulation, classification, checksumming, FIB look-up, and encapsulation) takes about ten microseconds, depending upon the capacity of the router CPU and memory allocation scheme. With the introduction of sophisticated QoS queuing algorithms, this processing time may be significantly increased, especially where per-flow based QoS processing (e.g. flow-based WFQ) is provided. This increased processing time may result in unacceptably long delays and possibly loss of delay-sensitive packets (e.g., voice/video packets).

Additionally, the introduction of these sophisticated algorithms increases the overhead and design complexity of the router. Accordingly, to compensate for these undesirable factors, conventional wisdom teaches the desirability of streamlining the other (non-QoS) processing events within the router (such as, for example, decapsulation, classification, and FIB) in order to minimize the overhead and processing time necessary for implementing these non-QoS events.

Contrary to conventional wisdom, however, the technique of the present invention makes a radical shift away from conventional router designs by incorporating an intermediate data structure 814 (FIG. 8A) into the router system architecture. Additional processing control elements (which may be implemented in either hardware or software) have also been incorporated into router 800 (FIG. 8A) for separating the overall packet processing process into two phases—a preprocessing phase (Phase I) during which delay-sensitive packets are fully processed and non-delay-sensitive packets are stored in the intermediate data structure 814; and an intermediate queue processing phase (Phase II) during which intermediate packets queued within the intermediate data structure are retrieved and fully processed. Moreover, test results show that deferring full processing of non-delay-sensitive packets in accordance with the technique of the present invention does not significantly impact the end-to-end performance of non-delay-sensitive applications which utilize these packets.

The two-phase packet processing technique of the present invention will now be described in greater detail with reference to FIGS. 5, 6, and 8A. Router 800 of FIG. 8A has been simplified for purposes of the discussion below. However, it is to be understood that router 800 includes additional features (not shown) which have been described previously with reference to router 10 of FIG. 4.

Figure 8A:
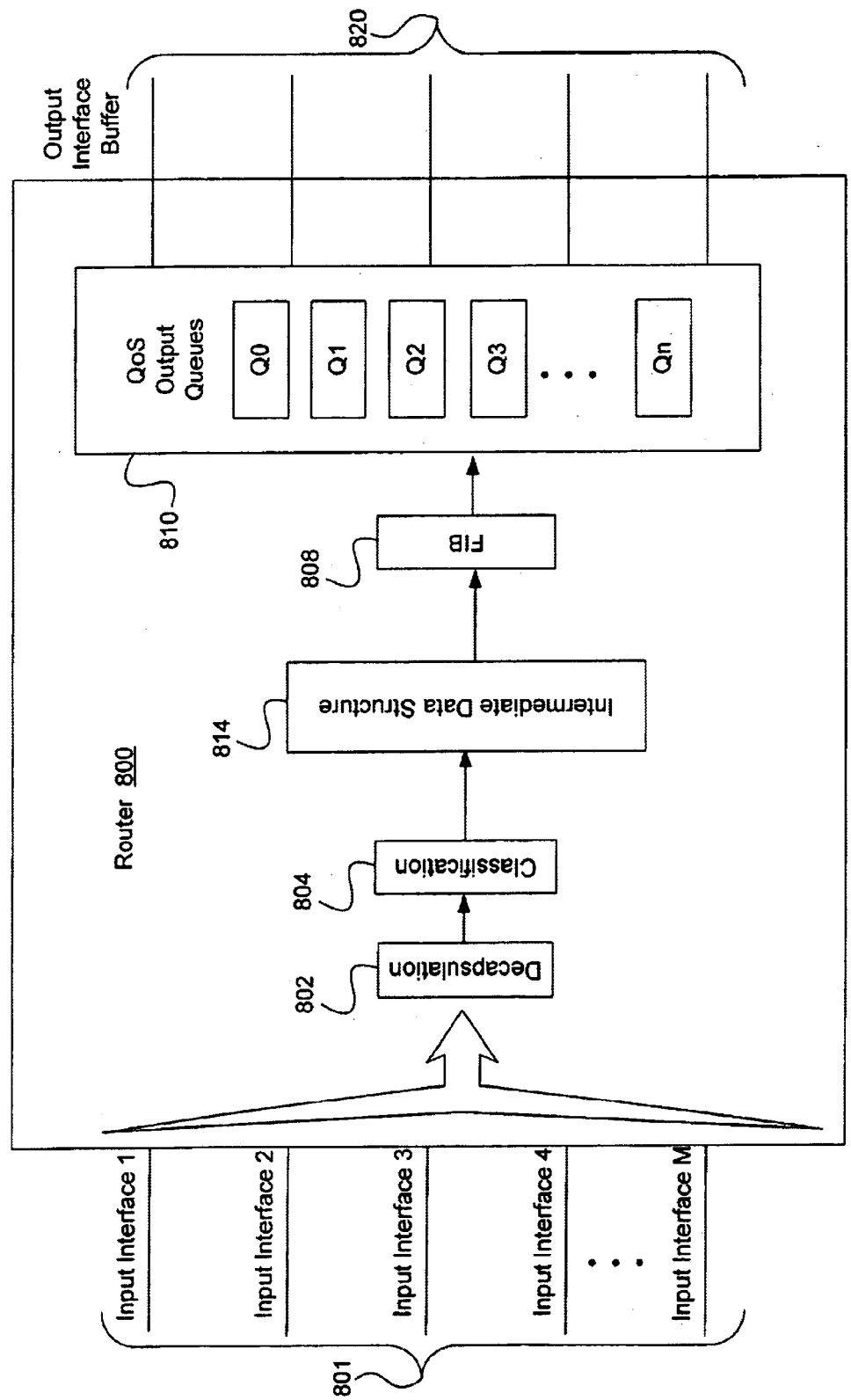
FIG. 8A illustrates a schematic block diagram of a specific embodiment of router 800, which has been modified in accordance with the technique of the present invention.

In accordance with the technique of the present invention, a two-phase packet processing technique is provided for processing packets at router 800 (FIG. 8A). During Phase 1, packets are dequeued from the input interface 801 and preprocessed. In a specific embodiment, the preprocessing includes packet decapsulation and classification in order to identify the associated priority level of each processed packet to thereby determine whether or not a particular packet is delay-sensitive.

The first phase should preferably be as simple as possible, so that the packet forwarding engine or processor takes as little time as possible to preprocess each packet. The primary purpose of the preprocessing phase is to determine if a particular packet is delay-sensitive and/or to determine the associated priority level of that packet. Examples of delay-sensitive packets include voice, video, high priority control packets, and other time-sensitive or high priority packets requiring immediate processing/routing.

The associated priority level for each packet is typically determined by the information contained with in the type of service (ToS) field within each packet. However, a number of other techniques for determining the associated priority level of a particular packet may be used. For example, the associated priority level of a packet may be determined by examining other information either contained within or related to the packet such as, for example, an option field, a protocol type, a source address, a TCP port number, an IP protocol, and/or an ATM/QoS identifier.

In a specific embodiment of the present invention, a packet is determined to be delay-sensitive if its associated priority level is at least priority P or higher. If it is determined that a particular packet is delay-sensitive, the packet is immediately and fully processed, wherein full processing includes processing the delay-sensitive packet sufficiently to be routed to at least one output interface queue. Thus, for example, full processing may include checksumming, FIB look-up, QoS processing, and/or encapsulation. If, however, it is determined that the packet is not delay-sensitive, the packet is enqueued in one of the intermediate queues within intermediate data structure 814 (FIG. 8A). Packets queued within the intermediate data structure are not fully processed until Phase II processing commences.

Figure 8B:
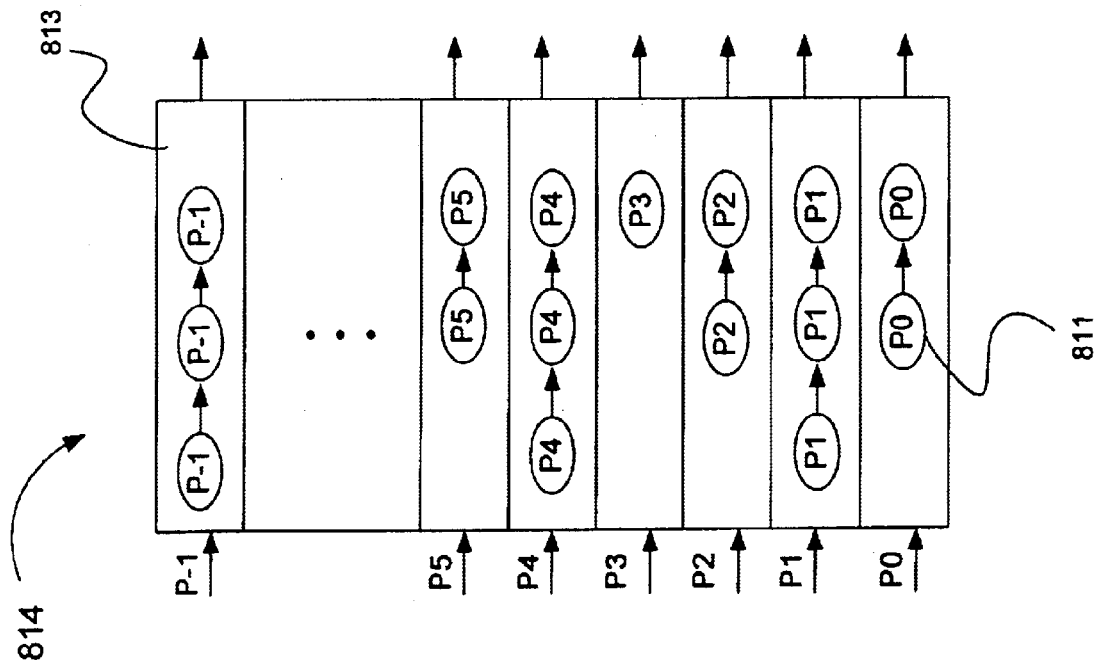
FIG. 8B illustrates a block diagram of the intermediate data structure 814 of FIG. 8A.

FIG. 8B shows a schematic block diagram of a specific embodiment of the intermediate data structure 814 of FIG. 8A. In the embodiment of FIG. 8B, the intermediate data structure comprises a plurality of intermediate queues 813, each queue being associated with a particular priority level (e.g., P0, P1, P2 . . . , P–1). Packets (811) which have been preprocessed and determined to be non-delay-sensitive (herein referred to as "intermediate packets" or "preprocessed packets")are stored within the intermediate data structure 814 in an appropriate location related to each packet's associated priority level.

The intermediate data structure 814 may be any data structure suitable for storing and retrieving packets. Examples of data structures include an array of queues (FIG. 8B), a linked list, a priority queue, a calendar queue, a binary tree, a binary heap, a FIFO queue, etc.

In specific embodiments of the present invention, intermediate data structure 814 comprises an array of queues. In one specific embodiment, the number of queues in the intermediate data structure 814 is related to the number of priority levels supported by the router. Thus, there is a separate queue for each distinct priority level lower than priority P, as classified by the router CPU. In this specific embodiment, it is assumed that packets having an associated priority level of P or higher indicate delay-sensitive packets. These delay sensitive packets are immediately and fully processed and are not stored within the intermediate data structure 814. In an alternate embodiment (not shown) a single intermediate queue is provided for queuing all non-delay-sensitive packets. In this alternate embodiment, all pre-processed packets having an associated priority level lower than priority P will be enqueued within the single intermediate queue.

In the case where P is greater than 1, a plurality of multiple intermediate queues are maintained, as shown in FIG. 8B. In a specific embodiment, these multiple queues are organized as an array of size P (P0 through P–1). One reason for organizing the multiple queues in this manner is that it provides a fast and convenient method for using the priority value of a packet as an index to determine the particular queue to access in the intermediate queue array 814. In an alternate embodiment, the queue size of the intermediate data structure 814 is equal or related to the number of router interfaces.

Figure 5:
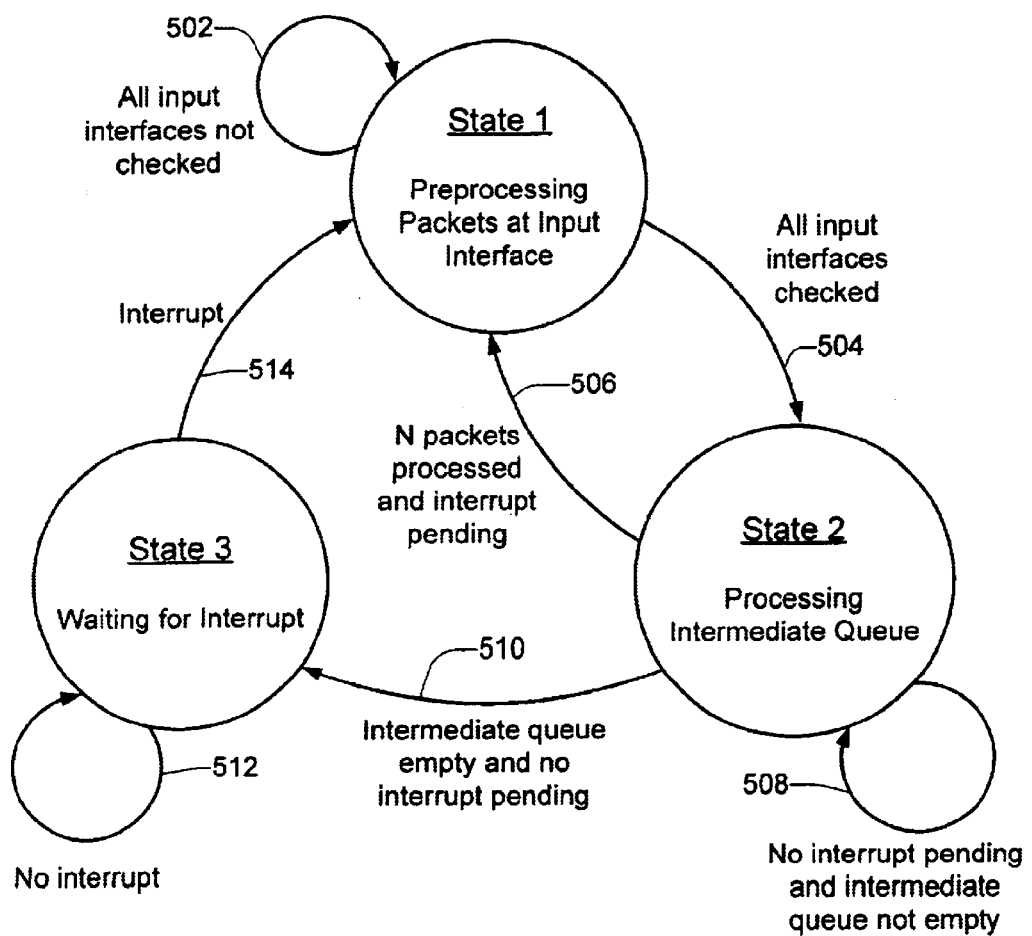
FIG. 5 shows a state diagram illustrating a specific embodiment of how the technique of the present invention may be implemented in a router such as router 800 of FIG. 8A.

FIG. 5 shows a state diagram of a specific embodiment for implementing the packet processing technique of the present invention. Phase I of the present invention generally corresponds to states 1 and 3 of FIG. 5. Phase II of the present invention generally corresponds to State 2 of FIG. 5.

Figure 6:
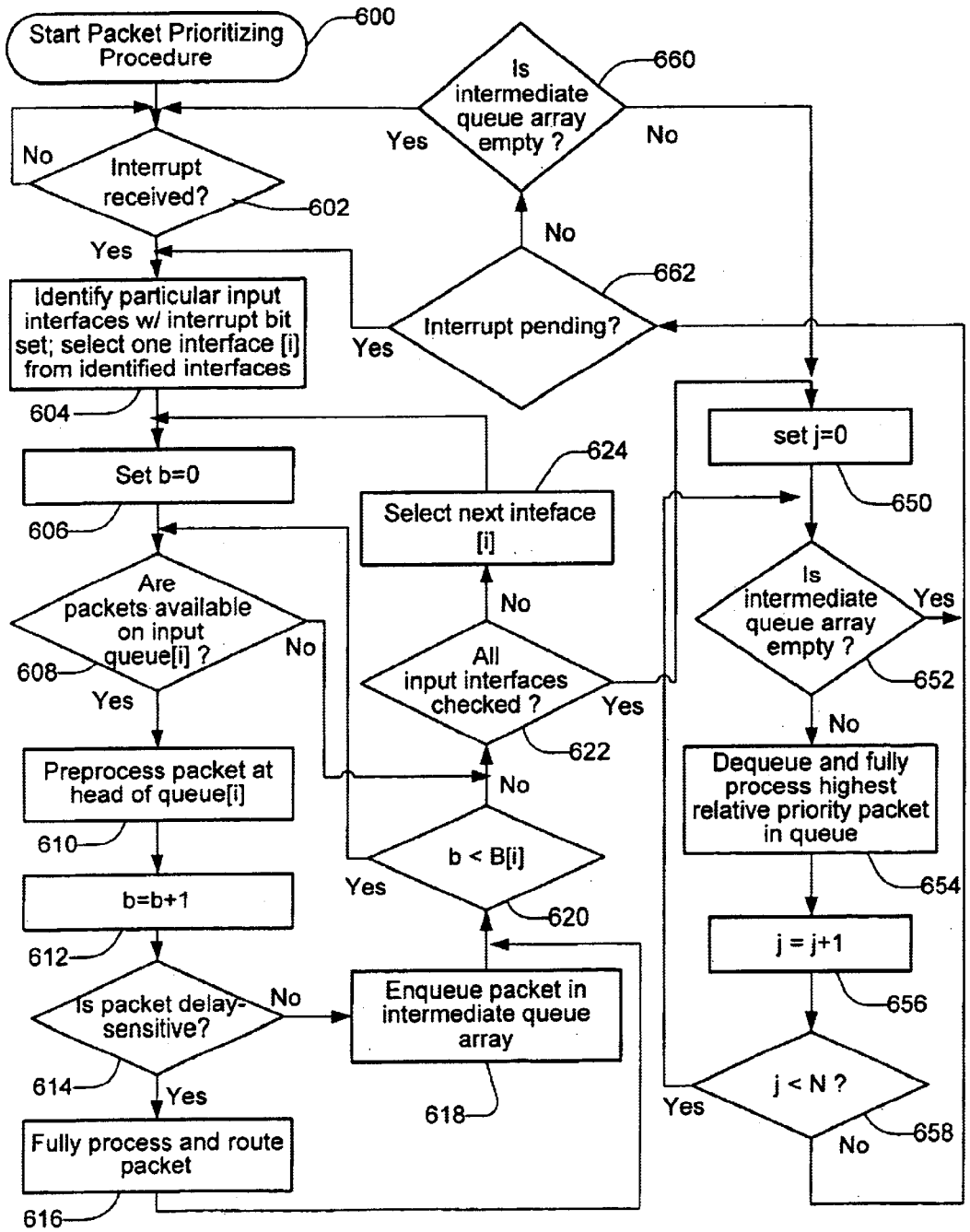
FIG. 6 illustrates a flow diagram of the state diagram of FIG. 5.

FIG. 6 shows a flow diagram of a specific embodiment for implementing the technique of the present invention in accordance with the state diagram of FIG. 5. The state and flow diagrams of FIGS. 5 and 6 will now be described in greater detail with reference to FIG. 8A.

Since the technique of the present invention is a continuous process, it may be entered at any point. However, for convenience, analysis will begin at State 3 of FIG. 5 (Waiting for Interrupt), which corresponds to block 602 of FIG. 6. During the time while there are no packets sitting on any of the input interface lines 801, the router remains in State 3 of FIG. 5. When a packet arrives at the input interface, an interrupt signal is provided to the processor, thereby causing the router to enter State 1 (Preprocessing Packets at Input Interface). While in State 1, the router dequeues and classifies packets from the plurality of input interface lines or cards 801. The following section describes a number of processing events which occur while the router 800 is preprocessing packets in accordance with Phase I of the technique of the present invention.

Phase I—Preprocessing of Packets at Input Interface

Generally, according to the state diagram of FIG. 5, Phase I processing (i.e., the preprocessing of packets at the input interface 801) continues until all input interface lines have been checked at least once for packets to process. Once all input interfaces have been traversed (504), the processor switches from State 1 to State 2, wherein the processor begins Phase II processing (i.e., processing of packets within intermediate data structure 814).

Referring to FIG. 6, once an interrupt is received, the particular input interface which invoked the interrupt, commonly denoted as interface [i], is identified. An interface pointer is then set to select interface [i] (604). At 606, the variable b is set equal to zero. This variable represents the number of packets which are preprocessed from the current interface [i] during one cycle of Phase I processing.

At 608, the input interface [i] is checked to see if there are any packets queued on the selected interface line. If there are no packets queued at input interface [i], the system determines whether all input interface lines have been checked for newly arrived packets (622). If all input lines have not been checked, at 624, the value of [i] is incremented so as to select the next input interface line/card, and the procedure returns to block 606.

Assuming, however, that the value of the expression in block 608 evaluates to true, meaning that there are packets available on the selected input interface line [i], then, the packet at the head of the queue is dequeued and preprocessed (610) in accordance with the technique of the present invention. In a specific embodiment, this preprocessing procedure includes decapsulating and classifying the selected packet.

Once the packet has been preprocessed, at 612, the value of the variable b is incremented by one to indicate that an additional packet from input interface [i] has been preprocessed.

When the packet is preprocessed at 610, the associated priority level of the packet is determined. At 614, the priority level of the packet is evaluated to determine if the packet is delay-sensitive.

One technique for making this determination is to compare the value of the packet's associated priority level to one or more predetermined priority level values indicating delay sensitivity. Thus, for example, if the associated priority level of the packet is equal to or higher than priority P (where priority P indicates delay sensitivity), the result of the expression in block 614 will evaluate to true (i.e., "yes"), otherwise, the expression within block 614 will evaluate to false (i.e., "no").

At 616, if it is determined that the packet is delay-sensitive, the packet is fully processed and routed, whereupon control of the procedure is then transferred to block 620. If, however, the packet is determined not to be delay-sensitive, at 618, the packet is stored within the intermediate data structure 814 in an order according to its associated priority level, as shown, for example, in FIG. 8B.

In a specific embodiment of the present invention, it is assumed that a packet may have an associated priority level value ranging from 0 to P, where P indicates delay-sensitive priority. Further, in FIG. 8B, for example, it is assumed that each distinct intermediate priority queue is associated with a respective priority level value. For example, a packet having a priority value of 1 will have an associated priority level of P1, and will be queued within intermediate queue P1. In the same manner, a packet having a priority value of 6 will have an associated priority level of P6, and will be queued within intermediate queue P6. It is to be understood, however, that alternate schemes may be used to map one or more priority values to a particular priority level, where appropriate. For example, in a alternate embodiment of the present invention (not shown), packets having priority values of less than a specified value (e.g. less than a priority value of 3) may each be associated with priority P0, and queued within intermediate queue P0. Further, where appropriate, it may be desirable to assign priority levels to packets based upon factors other than each packet's associated priority value.

At block 620, the number of packets (represented by the variable b) which have been preprocessed on the current input interface [i] is compared to the maximum number of packets to be processed for that particular input interface [i] (represented as B[i]) during one round or cycle of Phase I processing. Generally, the intent during Phase I processing is to service each individual input interface line at least once before proceeding to Phase II. The selection of the first input interface line for servicing is not of critical importance so long as each individual input interface line/card is preferably serviced at least once during Phase I. Moreover, each particular input interface line has a respective maximum value for the number of packets to be processed from that line during one cycle of Phase I processing. This maximum packet processing value (B[i]) may be predetermined, and may differ for each respective input interface line/card. As an example, each B[i] value may be within the range of 5–20 packets.

If the number of packets processed from input interface queue [i] has not exceeded its associated maximum allotted value (B[i]), control of the procedure is transferred back to block 608, whereupon at least one additional packet from input interface [i] is dequeued and preprocessed in accordance with the technique of the present invention.

Once the desired maximum number of packets has been processed from input interface [i], at 622, it is determined whether or not all input interface lines have been traversed at least once during this round of Phase I processing. If there are any remaining input interface lines which have not been serviced, at 624, the value of the interface pointer is incremented to select a next input interface which has not yet been serviced. Thereafter, the procedure returns to block 606 and begins preprocessing packets queued on the new input interface line.

Once each of the input interface lines has been checked at least once for packets to preprocess, the router or processor changes from State 1 to State 2 (Processing Intermediate Queue) via path 504 (FIG. 5). At this point, Phase II processing begins.

Phase II Processing

Referring to FIG. 5, Phase II processing occurs while the router or processor is in State 2 of the state diagram. While in State 2, processing of intermediate packets within the intermediate data structure 814 continues until either: a desired number of intermediate packets have been processed (506); or the intermediate data structure is empty (510). The actual processing events which take place during Phase II processing will now be described in greater detail with reference to FIG. 6.

Phase II generally begins at block 650 where the variable j is set equal to zero. This variable is used to keep track of the number of intermediate packets which are retrieved from the intermediate data structure and fully processed during one cycle of Phase II processing. At 652, a determination is made as to whether the intermediate data structure 814 is empty. If it is determined that the intermediate data structure is not empty, the highest relative priority packet within data structure 814 is retrieved and fully processed. Full processing may include, for example, checksumming, further packet classification, visitation of access lists, invoking sophisticated QoS queuing algorithms, FIB look-up, encapsulation, and routing the fully processed packet to an appropriate output interface queue within data structure 810. Not all of these full processing events need necessarily occur during Phase 11 processing. Depending upon the desired performance of the router system, at least some of these full processing events may occur during Phase I processing such as, for example, checksumming, further packet classification, and/or visitation of access lists. This is illustrated, for example, in FIGS. 8C and 8D of the drawings.

Figure 8D:
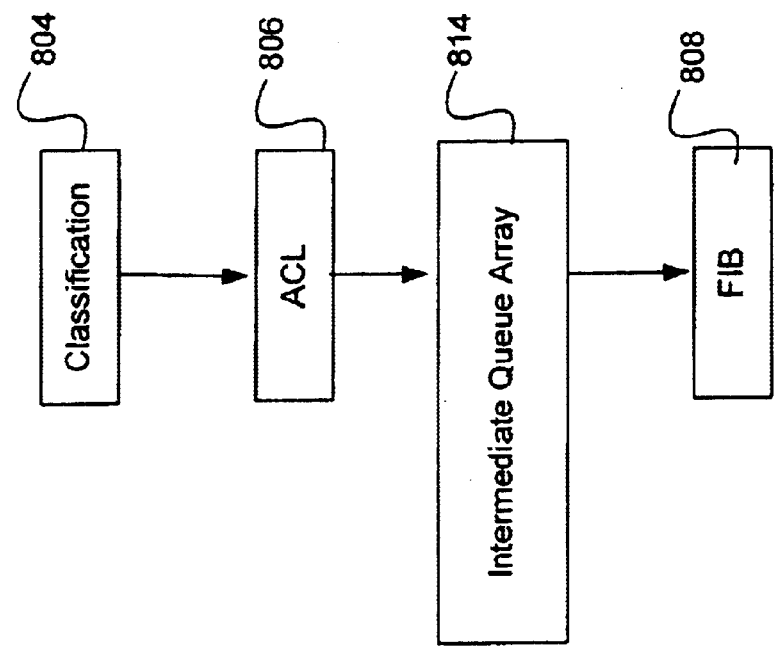
FIG. 8D illustrates an alternate embodiment of a portion of router 800 of FIG. 8A.
Figure 8C:
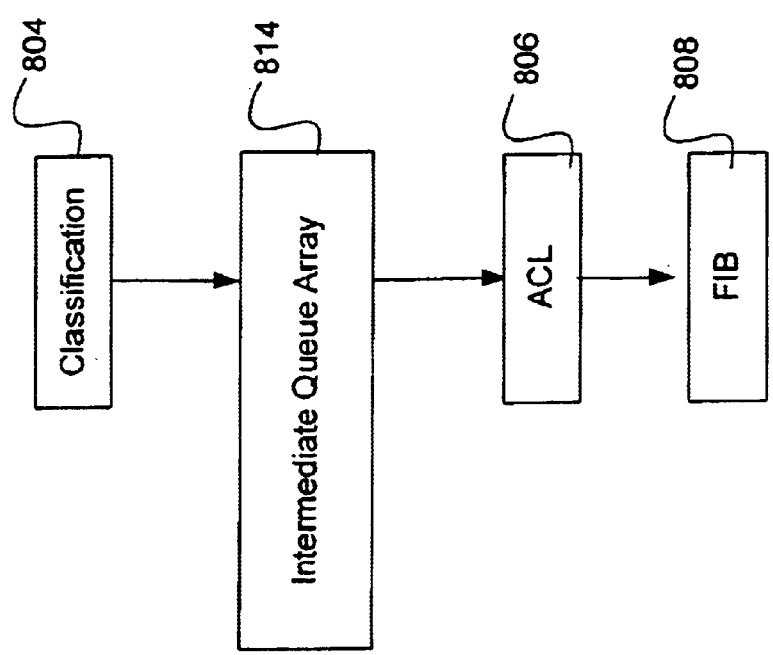
FIG. 8C illustrates one specific embodiment of a portion of router 800 of FIG. 8A.

FIG. 8C illustrates a specific embodiment of the present invention wherein access list verification (806) and FIB look-up (808) occur during Phase II processing of a packet. FIG. 8D illustrates an alternate embodiment of the present invention wherein access list verification (806) is implemented during Phase I processing of a packet. The placement of the various router processing events into either Phase I or Phase II may be varied in order to adjust the performance of router 800. Preferably, Phase I should be as simple as possible, so that the packet forwarding engine or processor is able to determine, as quickly as possible, whether a particular packet is delay-sensitive and/or the associated priority level of that packet.

Returning to FIG. 6, once an intermediate packet has been retrieved from the intermediate data structure and fully processed, the value of the variable j is incremented (656). At 658, a determination is made as to whether N intermediate packets have been processed during this round of Phase II processing.

The technique of the present invention uses a system parameter N which represents the maximum number of desired packets to be retrieved from the intermediate data structure and fully processed during one cycle of Phase II processing. This parameter may be used to determine how aggressively it is desired to promote delay-sensitive packets. For example, where N=1, the router will continually check for new packet arrivals at the input interface 801 after processing one intermediate packet from the intermediate data structure 814. Where N=10, the router will return to Phase I (and begin preprocessing packets from the input interface) after processing 10 intermediate packets (from the intermediate data structure 814) during Phase II. Where N=∞, the processor or forwarding engine will not return to Phase I until all intermediate packets have been fully processed from the intermediate data structure 814 during Phase II. The particular value for N may be predetermined, such as, for example, by a simulation study of the router system, or may be dynamically adjusted by the system administrator to vary the performance of the router system as desired. As an example, a typical range for N values may be between 30–80.

If the number of intermediate packets (i) processed during one round of Phase II processing is less than N, the procedure returns to block 652, whereupon an additional intermediate packet is retrieved and fully processed from the intermediate data structure, assuming that the intermediate data structure is not empty.

When the intermediate data structure 814 becomes empty, or, alternatively, where N intermediate packets have been fully processed during a particular round of Phase 11 processing, at 662, a determination is made whether an interrupt pending flag or bit has been set to indicate the existence of queued packets at the input interface. Each interface includes an interrupt register which can be read by the CPU to determine whether an interrupt is pending. If there is at least one packet queued at the input interface, the interrupt register will be set, and the CPU will identify an interrupt pending status.

If it is determined that there are additional packets awaiting processing at the input interface, the procedure 600 returns to block 604 to identify the particular input interface which triggered the interrupt pending status flag or bit. At this point, the router switches states from State 2 of FIG. 5 to State 1 via path 506.

Alternatively, if there is no interrupt pending, a determination is made as to whether the intermediate data structure is empty (660). If the intermediate data structure is empty, then the router will switch from State 2 of FIG. 5 to State 3 (Waiting for Interrupt) via path 510.

Alternatively, if the intermediate data structure is not empty (meaning that there are additional intermediate packets queued within data structure 814 awaiting full processing) Phase II processing of intermediate packets continues at 650, which, in FIG. 5, is represented by loop 508.

Implementation Issues

The packets in the intermediate queues are processed in an order according to each packet's associated priority value. In a specific embodiment, intermediate packets having a relatively higher priority value are processed ahead of intermediate packets having a relatively lower priority value. However, choosing a relatively small value for the parameter N may result in starvation of low priority packets queued within the intermediate data structure. To address this problem, a number of commonly known techniques may be implemented specifically for the purpose of avoiding starvation of low priority traffic. Examples of starvation avoiding techniques include priority promotion (sometimes referred to as priority aging) and weighted fair queuing (WFQ).

Priority aging is a technique of gradually increasing the priority of processes that wait in a particular system for an extended time interval, and is described in detail in the publication "Operating System Concepts" by Abraham Silbersciatz and Peter B. Galvin, 4th Ed., 1994, Addison-Wesley Publishing Company, Inc., pp. 142–143, ISBN#0-201-50480-4, herein incorporated by reference in its entirety for all purposes.

The priority aging concept may be applied in conjunction with the technique of the present invention to resolve the problem of indefinite delay of low priority packets in the system, as described briefly below.

After Phase II processing of N packets, the priority of all remaining intermediate packets within the intermediate data structure are promoted up one level (without necessarily changing the priority bits within each respective packet header).

This may easily be implemented (after Phase II processing), for example, by merging all remaining packets within priority queue P−2 into intermediate priority queue P−1, and increasing the priority of all remaining intermediate queues by 1. However, promoting all intermediate packets in this manner may quickly lead to an accumulation of all packets in the P−1 queue, thereby negating the advantage of prioritized processing. To remedy this latter problem, it may be desirable to restrict the number of packets being promoted and/or promote only a predetermined number of X packets every Y cycle of Phase II processing, where X and Y are greater than or equal to 1.

Another way to avoid starvation of low priority traffic is through the use of the well-known technique known as weighted fair queuing (WFQ). This technique is commonly known to those skilled in the art, and therefore will not be described in greater detail in the present application. A detailed description of this technique may be found in the publication entitled "A Generalized Processor Sharing Approach to Flow Control in Integrated Services Networks: The Single Node Case" by Abhay K. Parekh and Robert G. Gallager, IEEE/ACM Transactions on Networking, Volume 1, Number 3, Jun., 1993, pp. 344–357, herein incorporated by reference in its entirety for all purposes.

Both Phase I processing and Phase II processing may be performed by a single process or a single thread. This avoids the introduction of mutex locks which would otherwise be needed to synchronize the two processing phases. The single packet processing process or thread emulates two subprocesses or two threads: preprocessing (Phase I) and intermediate packet processing (Phase II). This emulation avoids splitting the packet processing technique into two separate processes or threads, thereby eliminating the need for mutex locks or interprocessing communications (IPCs).

Additionally, there are alternative ways to times lot the packet processing process/thread between preprocessing (Phase I) and intermediate packet processing (Phase II). For example, it is possible to use the number of intermediate packets being queued within data structure 814 as a parameter to limit the time used for preprocessing. Thus, for example, when the number of intermediate packets queued within the intermediate data structure reaches a predetermined number M, the router switches from Phase I processing to Phase II processing. Further, the parameter M may be dynamically configured by a router administrator to fine tune the system performance. For example, in low-end routers, the value for M may range from 30–80, whereas in high-end routers, the value for M may range from 50–150. Note, however, that these are merely exemplary values. A more precise value range for M will, of course, depend upon the system parameters, configuration and/or performance of the router.

The technique of the present invention significantly reduces packet processing latency, particularly with respect to high priority or delay-sensitive packets. Compared with the traditional single-packet mode of implementing a packet forwarding engine, the technique of the present invention significantly reduces the packet latency for delay-sensitive real time streams. Moreover, the technique of the present invention may be easily implemented in conventional routing systems. Further, it imposes little computational overhead, and consumes only a limited amount of memory resources within the system.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method for routing traffic in a packet-switched, integrated services network which supports a plurality of different service classes, the network including at least one router, the router including at least one input interface having at least one input interface and at least one output inter, the method comprising:

preprocessing a first packet from said input interface to determine if said fast packet is delay sensitive, wherein said preprocessing includes classifying said fist packet;

storing said first packet in an intermediate data structure before fully processing said first packet in response to a determination that said first packet is not delay sensitive, said intermediate data structure being used for queuing packets which have been preprocessed but which have not yet been processed sufficiently to be routed to an output interface queue;

preprocessing a second packet from said input interface while said first packet is queued in said intermediate data structure; and fully processing said second packet while said first packet is queued in said intermediate data structure in response to a determination that said second packet is delay sensitive, said fully processing including processing said second packet sufficiently to enable the second packet to be routed to an appropriate output interface queue.

2. The method of claim 1 further comprising fully processing said first packet in response to a determination that the first packet is delay sensitive, said fully processing including processing said first packet sufficiently to enable the second packet to be routed to an appropriate output interface queue.

3. The method of claim 1 further comprising storing said second packet in said intermediate data structure, before fully processing said second packet, in response to a determination that said second packet is not delay sensitive.

4. The method of claim 1 wherein fully processing includes Forwarding Information Base (FIB) look-up processing.

5. The method of claim 4 further including:

retrieving said first packet from said intermediate data structure;

fully processing said first packet; and storing the fully processed first packet into an appropriate output interface queue.

6. The method of claim 1 wherein said preprocessing includes determining an associated priority level of said first and second packets.

7. The method of claim 6 wherein a packet is determined to be delay sensitive if the associated priority level of the packet is at least of priority P, and wherein the packet is determined not to be delay sensitive if the associated priority level of the packet is less than priority P.

8. The method of claim 7 wherein said priority P is a highest priority.

9. The method of claim 6 wherein said storing includes storing said first packet in said intermediate data structure in an order based upon an associated priority level of said first packet.

10. The method of claim 1 further including checking each respective input interface line at least once for packets to preprocess before retrieving and processing packets from said intermediate data structure.

11. The method of claim 1 further including preprocessing additional packets from said input interface after a desired number of packets from said intermediate data structure have been retrieved and fully processed.

12. The method of claim 1 further including retrieving and fully processing packets queued in said intermediate data structure after a desired number of packets from said input interface have been preprocessed.

13. The method of claim 12 further comprising continuing to retrieve and fully process packets queued in said intermediate data structure if:

said desired number of packets from said input interface have been processed, and an interrupt signal indicating an arrival of additional packets at said input interface is not received.

14. The method of claim 12 wherein said retrieving includes retrieving and processing packets from sail intermediate data structure in an order relating to each packet's associated priority level.

15. The method of claim 1 further comprising preprocessing additional packets from said input interface if:

an interrupt signal is received indicating an arrival of additional packets at said input interface, and a desired number of packets from said intermediate data structure have been retrieved and fully processed.

16. The method of claim 1 wherein the intermediate data structure comprises a plurality of queues, and wherein each of the plurality of queues is associated with a respective priority level.

17. A computer program product for routing traffic in a packet-switched, integrated services network which supports a plurality of different service classes, the network including at least one router, the router including at least one input interface having at least one input interface and at least one output interface, the computer program product comprising:

a computer usable medium having computer readable code embodied therein, the computer readable code comprising:

computer code for preprocessing a first packet from said input interface to determine if said first packet is delay sensitive, wherein said preprocessing includes classifying said first packet;

computer code for storing said first packet in an intermediate data structure before fully processing said first packet in response to a determination that said first packet is not delay sensitive, said intermediate data structure being used for queuing packets which have been preprocessed but which have not yet been processed sufficiently to be routed to an output interface queue;

computer code for preprocessing a second packet from said input interface while said first packet is queued in said intermediate data structure; and computer code for fully processing said second packet while said first packet is queued in said intermediate data structure in response to a determination that said second packet is delay sensitive, said fully processing computer code including processing said second packet sufficiently to enable the second packet to be routed to an appropriate output interface queue.

18. The computer program product of claim 17 further comprising computer code for fully processing said first packet in response to a determination that the first packet is delay sensitive, said fully processing computer code including computer code for processing said first packet sufficiently to enable the second packet to be routed to an appropriate output interface queue.

19. The computer program product of claim 17 further comprising computer code for storing said second packet in said intermediate data structure, before fully processing said second packet, in response to a determination that said second packet is not delay sensitive.

20. The computer program product of claim 17 wherein fully processing computer code includes computer code for Forwarding Information Base (FIB) lookup processing.

21. The computer program product of claim 20 further including:

computer code for retrieving said first packet from said intermediate data structure;

computer code for fully processing said first packet; and computer code for storing the fully processed first packet into an appropriate output interface queue.

22. The computer program product of claim 17 wherein said preprocessing computer code includes determining an associated priority level of said first and second packets.

23. The computer program product of claim 22 wherein a packet is determined to be delay sensitive if the associated priority level of the packet is at least of priority P, and wherein the packet is determined not to be delay sensitive if the associated priority level of the packet is less than priority P.

24. The computer program product of claim 23 wherein said priority P is a highest priority.

25. The computer program product of claim 22 wherein said storing computer code includes computer code for storing said first packet in said intermediate data structure in an order based upon an associated priority level of said first packet.

26. The computer program product of claim 17 further including computer code for checking each respective input interface line at least once for packets to preprocess before retrieving and processing packets from said intermediate data structure.

27. The computer program product of claim 17 further including computer code for preprocessing additional packets from said input interface after a desired number of packets from said intermediate data structure have been retrieved and fully processed.

28. The computer program product of claim 17 further including computer code for retrieving and fully processing packets queued in said intermediate data structure after a desired number of packets from said input interface have been preprocessed.

29. The computer program product of claim 28 further comprising computer code for continuing to retrieve and fully process packets queued in said intermediate data structure if:

said desired number of packets from said input interface have been processed, and an interrupt signal indicating an arrival of additional packets at said input interface is not received.

30. The computer program product of claim 28 wherein said retrieving computer code includes computer code for retrieving and processing packets from said intermediate data structure in an order relating to each packet's associated priority level.

31. The computer program product of claim 17 further comprising computer code for preprocessing additional packets from said input interface if:

an interrupt signal is received indicating an arrival of additional packets at said input interface, and a desired number of packets from said intermediate data structure have been retrieved and fully processed.

32. The computer program product of claim 17 wherein the intermediate data structure comprises a plurality of queues, and wherein each of the plurality of queues is associated with a respective priority level.

33. A router for routing traffic in a packet-switched integrated services network which supports a plurality of different service classes, the router comprising:

a processor;

at least one input interface;

at least one output interface; and memory having at least one intermediate data structure;

the router being configured or designed to preprocess a first packet from said input interface to determine if said first packet is delay sensitive, wherein said preprocessing includes classifying said first packet;

the router being configured or designed to store said first packet in an intermediate data structure before fully processing said first packet in response to a determination that said first packet is not delay sensitive, said intermediate data structure being used for queuing packets which have been preprocessed but which have not yet been processed sufficiently to be routed to an output interface queue;

the router be configured or designed to preprocess a second packet from said input interface while said first packet is queued in said intermediate data structure; and the router being configured or designed to fully process said second packet, while said first packet is queued in said intermediate data structure, in response to a determination that said second packet is delay sensitive, said fully processing including processing said second packet sufficiently to enable the second packet to be routed to an appropriate output interface queue.

34. The router of claim 33 wherein the router is further configured or designed to fully process said first packet in response to a determination that the first packet is delay sensitive, said fully processing including processing said first packet sufficiently to enable the second packet to be routed to an appropriate output interface queue.

35. The router of claim 33 wherein the router is further configured or designed to store said second packet in said intermediate data structure, before fully processing said second packet, in response to a determination that sad second packet is not delay sensitive.

36. The router of claim 33 wherein fully processing includes Forwarding Information Base (FIB) look-up processing.

37. The router of claim 36 wherein the router is further configured or designed to:

retrieve said first packet from said intermediate data structure;

fully process said first packet; and store the fully processed first packet into an appropriate output interface queue.

38. The router of claim 33 wherein said preprocessing includes determining an associated priority level of said first and second packets.

39. The router of claim 38 wherein a packet is determined to be delay sensitive if the associated priority level of the packet is at least of priority P, and wherein the packet is determined not to be delay sensitive if the associated priority level of the packet is less than priority P.

40. The router of claim 39 wherein said priority P is a highest priority.

41. The router of claim 38 wherein said storing includes storing said first packet in said intermediate data structure in an order based upon an associated priority level of said first packet.

42. The router of claim 33 wherein the router is further configured or designed to check each respective input interface line at least once for packets to preprocess before retrieving and processing packets from said intermediate data structure.

43. The router of claim 33 wherein the router is further configured or designed to preprocess additional packets from said input interface after a desired number of packets from said intermediate da structure have been retrieved and fully processed.

44. The router of claim 33 wherein the router is further configured or designed to retrieve and fully process packets queued in said intermediate data structure after a desired number of packets from said input interface have been preprocessed.

45. The router of claim 44 wherein the router is further configured or designed to continuing to retrieve and fully process packets queued in said intermediate data said desired number of packets from said input interface have been processed, and an interrupt signal indicating an arrival of additional packets at said input interface is not received.

46. The router of claim 44 wherein said retrieving includes retrieving and processing packets from said intermediate data structure in an order relating to each packet's associated priority level.

47. The router of claim 33 wherein the router is further configured or designed to preprocess additional packets from said input interface if:

an interrupt signal is received indicating an arrival of additional packets at said input interface, and a desired number of packets from said intermediate data structure have been retrieved and fully processed.

48. The router of claim 33 wherein the intermediate data structure comprises a plurality of queues, and wherein each of the plurality of queues is associated with a respective priority level.

49. A system for routing traffic in a packet-switched, integrated services network which supports a plurality of different service classes, the network including at least one router, the router including at least one input interface having at least one input interface and at least one output interface, the system comprising:

means for preprocessing a first packet from said input interface to determine if said first packet is delay sensitive, wherein said preprocessing includes classifying said first packet;

means for storing said first packet in an intermediate data structure before fully processing said first packet in response to a determination that said first packet is not delay sensitive, said intermediate data structure being used for queuing packets which have been preprocessed but which have not yet been processed sufficiently to be routed to au output interface queue;

means for preprocessing a second packet from said input interface while said first packet is queued in said intermediate data structure; and means for fully processing said second packet while said first packet is queued in said intermediate data structure in response to a determination that said second packet is delay sensitive, said fully processing means including processing said second packet sufficiently to enable the second packet to be routed to an appropriate output interface queue.

50. The system of claim 49 further comprising means for fully processing said first packet in response to a determination that the first packet is delay sensitive, said fully processing means including means for processing said first packet sufficiently to enable the second packet to be routed to an appropriate output interface queue.

51. The system of claim 49 further comprising means for storing said second packet in said intermediate data structure, before fully processing said second packet, in response to a determination that said second packet is not delay sensitive.

52. The system of claim 49 wherein the intermediate data structure comprises a plurality of queues, and wherein each of the plurality of queues is associated with a respective priority level.

* * * * *